United States Patent [19]

Ponstein

[11] 4,343,389

[45] Aug. 10, 1982

[54] MOBILE CONVEYOR

[76] Inventor: William M. Ponstein, 3615 Wentworth Dr., SW., Grand Rapids, Mich. 49509

[21] Appl. No.: 140,185

[22] Filed: Apr. 14, 1980

[51] Int. Cl.³ .................. B65G 21/10; B65G 41/00
[52] U.S. Cl. .................................. 198/316; 198/318; 405/179; 37/142.5; 414/686
[58] Field of Search .................. 198/300, 302–304, 198/306, 311, 315, 316, 318; 405/179; 37/142.5, 117.5, DIG. 3, 12; 414/686, 723, 724, 912, 747

[56] References Cited

U.S. PATENT DOCUMENTS

| | | | |
|---|---|---|---|
| 2,483,650 | 10/1949 | Lee | 198/302 |
| 3,583,168 | 6/1971 | Horton | 37/142.5 |
| 3,623,597 | 11/1971 | Arndt | 198/316 |
| 3,734,319 | 5/1973 | Frisk | 414/686 |
| 3,760,883 | 9/1973 | Birk | 414/723 |
| 3,826,353 | 7/1974 | Greasley | 198/313 |
| 3,945,484 | 3/1976 | Oury | 198/313 |
| 4,068,771 | 1/1978 | Zimmerman | 37/117.5 |
| 4,074,801 | 2/1978 | Monk et al. | 198/304 |
| 4,117,920 | 10/1978 | Oury | 198/311 |
| 4,236,329 | 12/1980 | Hetrick | 414/723 |
| 4,301,910 | 11/1981 | Price | 198/304 |

OTHER PUBLICATIONS

"The Self Propelled Konveyor", Publication, Kros Konveyor, Inc.
"Build Yourself the Ultimate Weapon", Construction Plant & Equipment, 12/78, pp. 28 and 30 29.

Primary Examiner—Joseph E. Valenza
Attorney, Agent, or Firm—Price, Heneveld, Huizenga & Cooper

[57] ABSTRACT

A mobile conveyor for backfilling trenches, ditches, and the like, in which pipes, wires, and other similar objects are buried, comprises a continuously moving conveyor belt assembly to transport excavated dirt from a digging or deposit point of the trench to a filling point thereof. A separate mobile transport unit or vehicle is provided to intermittently move the conveyor belt assembly along the trench, and laterally position the discharge end of the conveyor belt over the trench filling point. A connector pivotally mounts the upstream end of the conveyor belt assembly on the mobile power unit, and rams rotate the connector and conveyor in a substantially vertical plane to adjust the elevation of the conveyor discharge end over the trench. A telescoping stabilizer extends downwardly from the connector and engages the ground to support the conveyor in cantilevered fashion at a selected position during conveyance of the excavated material.

9 Claims, 11 Drawing Figures

MOBILE CONVEYOR

BACKGROUND OF THE INVENTION

The present invention relates to excavating equipment, and in particular to a backfill conveyor for trenches and the like.

Backfill conveyors are used in excavating long ditches, trenches, or the like, in which pipes, wires, cables, and other similar elongate objects are buried in the ground. Such conveyors typically have an upstream end positioned adjacent to the point at which the trench is being or has been dug, such that a backhoe, or other trenching machine can place the excavated dirt into a hopper associated with the conveyor or directly onto the conveyor. The conveyor extends along the open trench, wherein the pipe is laid, and the downstream end of the conveyor straddles the sides of the trench and backfills the trench with the excavated material. The conveyor and trencher are moved intermittently along the trench to various set up points so that as the pipe is positioned in the trench, it is buried in the ground in a substantially continuous process. Such continuous pipe laying arrangements not only eliminate the need to clean up numerous dirt piles along the sides of the trench, but they also minimize the amount of exposed, open trench, thereby alleviating the associated safety hazards and risk of vandalism.

Trench conveyors of the type disclosed above must be relatively long, in the nature of 50 to 100 feet, to insure that there is sufficient open trench in which to lay and position the pipe. As a result, it is quite difficult to securely support such a long coveyor segment along the trench, particularly in the conveying mode, wherein heavy dirt is being continuously carried along the conveyor. One arrangement for supporting a trench conveyor is disclosed in U.S. Pat. No. 3,583,186 to Horton, and comprises a pair of spaced apart wheels which straddle the sides of the ditch and support the discharge end of the conveyor above the ground. However, because the earth beneath the sides of the ditch is often very soft and uneven, such devices can become stuck and/or tip over. Further, the wheels must often be manipulated to avoid obstruction with objects disposed alongside of the ditch, such as trees, utility poles, pipes, wires, etc. Also, the lateral position of the discharge end of the conveyor over the open ditch is not easily adjusted to accommodate the side-to-side filling of very wide ditches.

Another problem heretofore experienced with trench conveyors relates to the ability of the device to adjust the elevation of the conveyor over the ditch and surrounding terrain. For example, in the laying of large drainage or sewer pipes, an earth moving device, such as a relatively small bulldozer must be used in the backfilling operation. In such circumstances, the ditch is sufficiently wide to bodily receive the bulldozer therein, and the bulldozer pushes the dirt discharged from the conveyor in an upstream direction into the trench to carefully cover the laid pipe and pack the dirt around the pipe to insure that it is securely anchored in position in the ground before the remainder of the ditch is filled. The bulldozer must travel under the downstream end of the conveyor to spread and compact the dirt thereunder. Hence, it is quite advantageous to have a conveyor mechanism which is capable of easily varying the elevation of the conveyor discharge end to provide sufficient clearance for the backfill bulldozer to pass thereunder.

Some integral pipe laying machines, such as that disclosed in U.S. Pat. No. 3,292,379 to McElvany, have a built-in trencher and include a jib with cables on which a conveyor is suspended to backfill the trench. However, in these devices, the cables on which the conveyor is suspended are positioned overhead, and thereby prevent the conveyor from being loaded from the top or upper side, as is required when separate trench conveyor units are used with backhoes, front end loaders, cranes, or other earth digging equipment.

SUMMARY OF THE INVENTION

The present invention provides a mobile conveyor arrangement for filling trenches and the like, and comprises a conveyor for transporting excavated trench material from a digging point to a filling point of the trench. A mobile transport is operably connected with the conveyor and intermittently moves the conveyor longitudinally along the trench to various conveyor set up points, and laterally positions the conveyor with respect to the trench. The upstream end of the conveyor is connected with the transport and is supported in a non-suspended, cantilevered fashion above the trench during conveyance of the excavated material.

Another aspect of the present invention is to pivotally connect the upstream end of a trench conveyor with a conveyor transport to bodily pivot the conveyor in a substantially vertical plane. A ram is operably connected between the transport and the conveyor and pivots the conveyor to an orientation wherein the downstream end of the conveyor assumes a selected position over the filling point of the trench. A stabilizing foot supports the conveyor in the selected position during conveyance of the excavated material.

Yet another aspect of the present invention is to provide a connector for attaching a trench conveyor to a crane of the type having bearing blocks in which a pivot arm is mounted, and a pair of rams for pivoting the arm. The connector comprises a rigid frame having a first pivot joint for pivotally mounting the connector in the crane bearing blocks for rotation in a substantially vertical plane. A second pivot joint is provided on the frame for pivotally connecting the outer ends of the rams with the connector at a point spaced apart from the first pivot joints, whereby extension and retraction of the rams pivot the connector about the first pivot joint. Means are provided for connecting the frame with the conveyor, whereby the connector and the conveyor are pivoted together into a selected position. A longitudinally adjustable stabilizer foot is connected with and depends from the connector frame, and is adapted to engage the ground during the conveyance of excavated materials on the conveyor for retaining the conveyor in the selected position.

The principle objects of the present invention are: to provide a trench conveyor which can be securely retained in a selected position above a trench without the assistance of either overhead support cables or spaced apart wheels at the discharge end or along the length of the conveyor; to provide a trench conveyor having a telescoping stabilizer foot at the upstream end of the conveyor to support the conveyor in a cantilevered fashion above the trench; to provide a trench conveyor which can be easily manipulated between the sides of a trench for evenly filling the same; to provide a trench conveyor which is easily transported from one location to another location along the trench; to provide a trench conveyor which is pivotally attached to a mobile power means for easily adjusting the elevation of the discharge end of the conveyor above the trench to permit earth moving devices to carefully backfill the trench about the pipe laid therein, and compress the loose dirt in the trench; to provide a trench conveyor having a hopper disposed at the upstream end thereof for filling by a separate or non-integral backhoe, front end loader, crane, trencher, or similar digging device; to provide a trench conveyor wherein the hopper has a low profile for efficient loading of the excavated material into the hopper; to provide a trench conveyor having easily connectable transport wheels for moving the conveyor between different job sites; to provide a conveyor which includes a relatively lightweight, rigid frame to securely hold the conveyor in a cantilevered position over the ditch; to provide a trench conveyor having a conveyor belt powered by an end drum which is rotated by hydraulic motors, whereby the conveyor assembly does not require a self-contained source of power; to provide a connector for attaching a remotely powered conveyor assembly with a conventional excavating machine; to provide a connector wherein the conveyor assembly is detachably connected therewith for easily removing the conveyor from the connector and power means assembly; to provide a mobile conveyor and connector therefor which are efficient in use, economical to manufacture, capable of a long operating life, and particularly well adapted for the proposed use.

These and other features, advantages, and objects of the present invention will be further understood and appreciated by those skilled in the art by reference to the following written specification, claims, and appended drawings.

DETAILED DESCRIPTION OF THE PREFERRED EMBODIMENTS

Figure 1:
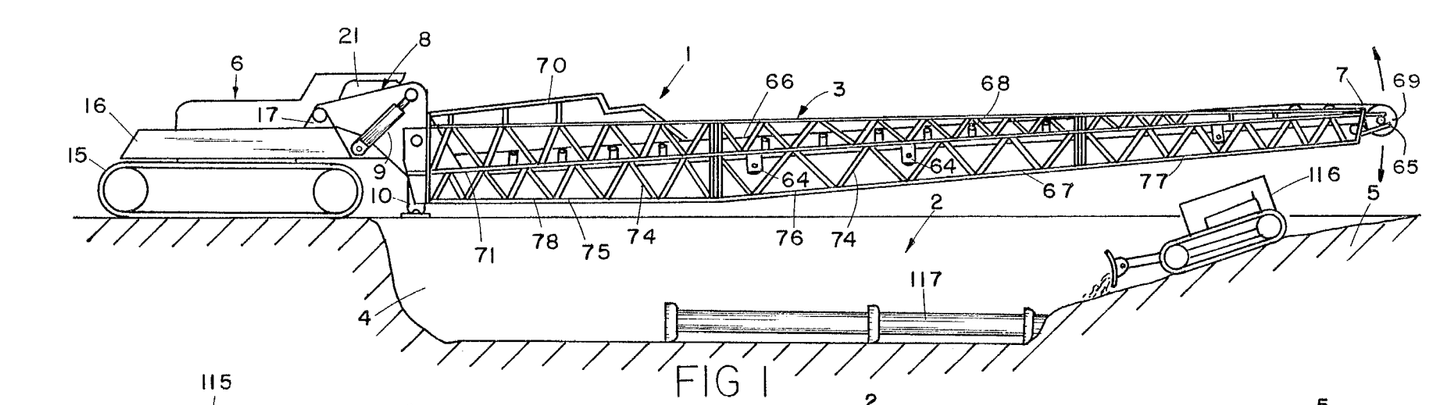
FIG. 1 is a partially schematic side elevational view of a mobile conveyor embodying the present invention, shown disposed adjacent a trench in which laid pipe is being buried by a backfill bulldozer.

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary.

The reference numeral 1 (FIG. 1) generally designates a mobile conveyor embodying the present invention, which is adapted for backfilling excavated areas such as ditches and trenches 2 in which pipes, wires, and other similar objects are buried. Conveyor 1 comprises a continuously moving conveyor belt assembly 3 to transport dirt excavated from trench 2 from a digging point 4 of trench 2 to a filling point 5 thereof. A separate or non-integral mobile transport unit or vehicle 6 is provided to intermittently move conveyor 3 along trench 2, and laterally position the discharge end 7 of conveyor 3 over the filling point 5 of the trench. A connector 8 pivotally mounts the upstream end of conveyor 3 on transport unit 6, and rams 9 rotate the connector and conveyor 3 in a substantially vertical plane to adjust the elevation of the conveyor discharge end 7 over the trench 2. A telescoping stabilizer 10 extends downwardly from connector 8, and engages the ground to support the conveyor in a cantilevered fashion at the selected position during the conveyance of excavated material over the conveyor.

Figure 2:
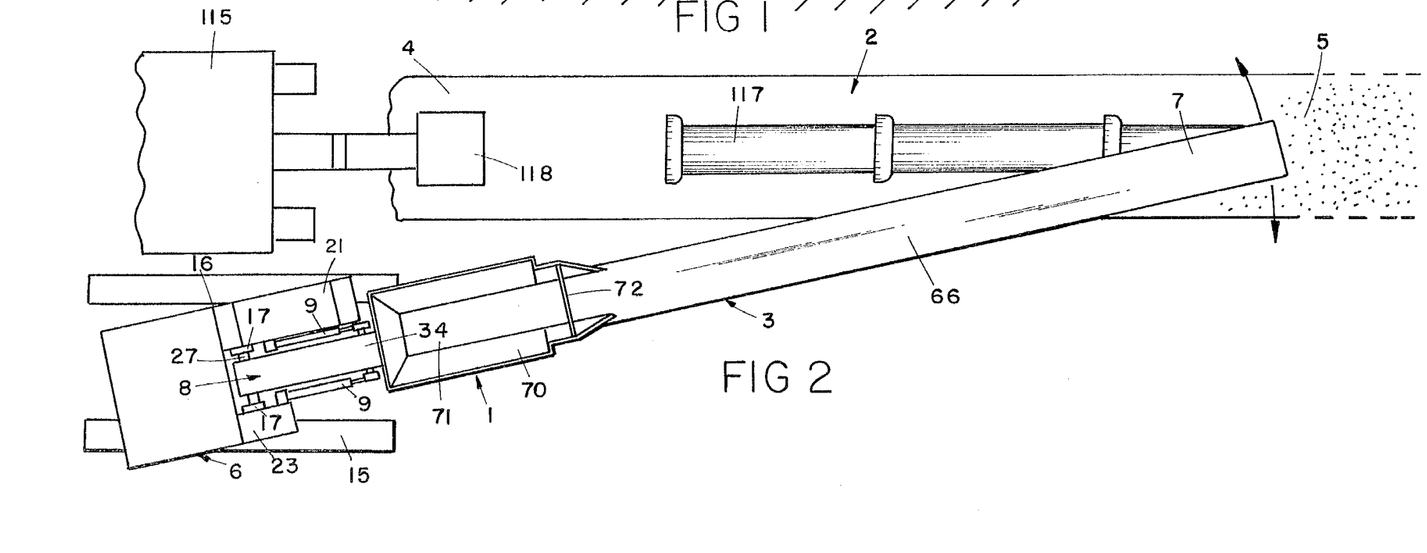
FIG. 2 is a partially schematic top plan view of the mobile conveyor, shown disposed alongside a trenching device, and carrying excavated materials to a filling point of a trench in which pipe is being laid.

The transport or mobile power unit 6 may comprise substantially any suitable self-propelled mechanism which is adapted to be used around excavation sites, and is capable of moving the conveyor assembly 3 from one location to another along the trench 2. In the embodiment shown in FIGS. 1-9, transport 6 comprises a standard crane tractor having a tracked drive mechanism 15 (FIG. 3) on which the body 16 of the crane tractor is pivotally mounted for rotation in a substantially horizontal plane. Crane tractor 6 includes a pair of laterally aligned, spaced apart bearings or pillow backs 17 in which various attachments can be pivotally mounted. The rams 9 on crane tractor 6 comprise hydraulic cylinders, having the lower ends 18 thereof pivotally mounted by pins 18' in supports 22 on the crane tractor body 16, which are spaced apart and vertically aligned with pillow blocks 17. Both of the hydraulic cylinders 9 include a reciprocating rod 19 having a sleeve 29 mounted on the free end thereof for pivotal connection with the selected crane attachment. Crane tractor 6 also includes a cab 21 in which controls are located to operate hydraulic cylinders 9, and the other operative function of the crane. As best shown in FIG. 2, the space formed between pillow blocks 17 and ram supports 22 is located at the forward center portion of the crane tractor, with cab 21 oriented to the operator's left, and outboard crane frame 23 disposed to the operator's right.

Figure 3:
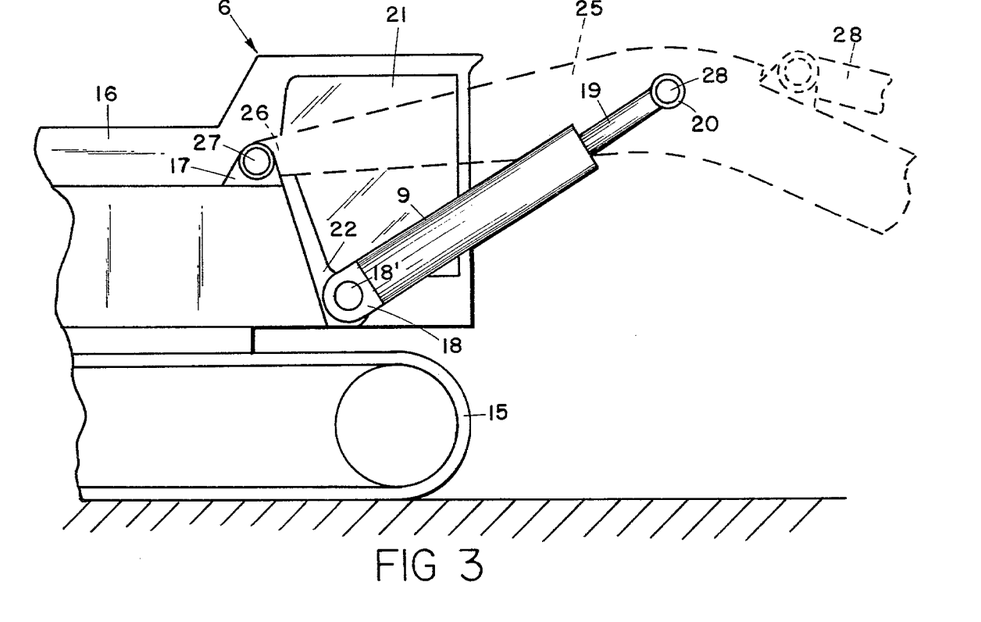
FIG. 3 is a partially schematic, fragmentary, side elevational view of a conventional backhoe excavating machine in which an arm digging member thereof is shown in broken lines.

With reference to FIG. 3, the arrangement of the crane tractor pillow blocks 17, supports 22, and hydraulic cylinders 9 is a conventional design which is used widely throughout the industry. This mounting arrangement can be used to connect a backhoe, such as the backhoe arm 25 which is shown in broken lines. The inward end 26 of backhoe arm 25 is pivotally connected in pillow blocks 17 by a through pin 27, and the sleeves 20 on hydraulic cylinder rods 19 are pivotally attached to a pair of rods 28 which project outwardly from opposing sides of the backhoe arm. The backhoe attachment normally includes other pivoted linkages, such as arm 28, to achieve the various articulated motions of the attachment.

The same mounting arrangement is also adapted to attach a crane jib (not shown) to the crane tractor 6 wherein the jib is pivotally mounted at one point thereof in pillow blocks 17, and rams 9 are attached to the jib at a spaced apart position thereon to very the angular orientation of the jib.

Figure 4:
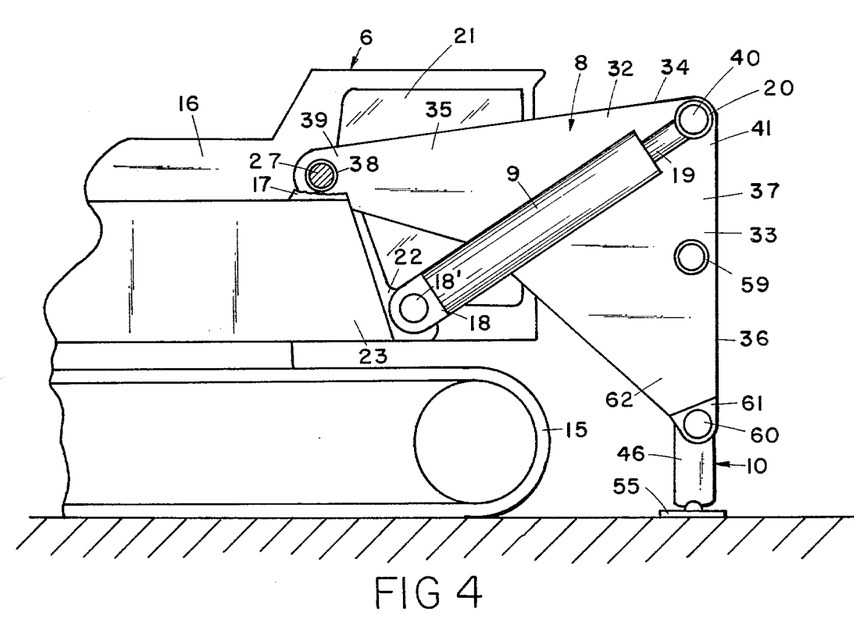
FIG. 4 is a partially schematic, fragmentary, side elevational view of the backhoe machine of FIG. 3, wherein the digging arm has been removed, and a conveyor connector has been attached thereto.
Figure 5:
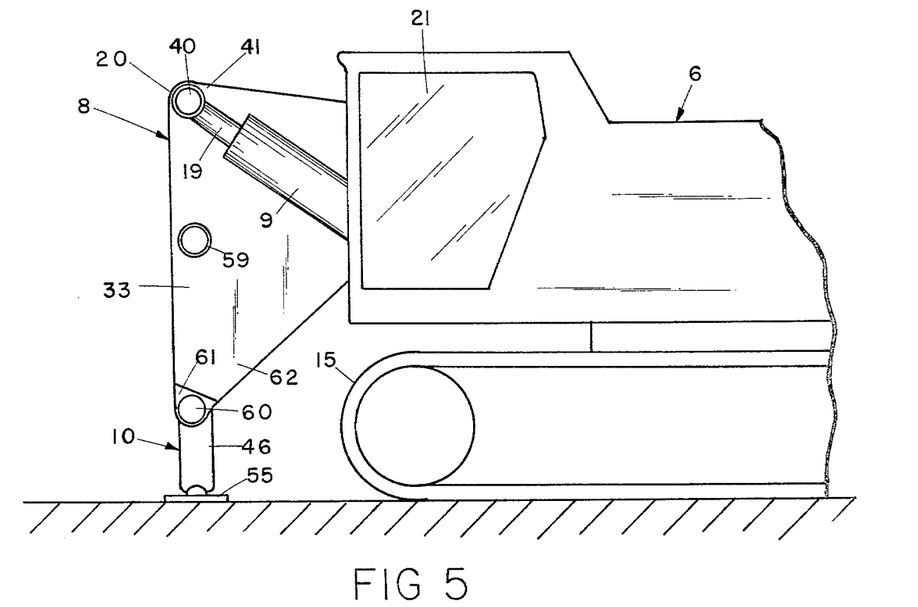
FIG. 5 is a partially schematic, fragmentary, side elevational view of the other side of the backhoe machine and connector shown in FIG. 4.

With reference to FIG. 4, connector 8 is disposed pivotally between and mounted in pillow blocks 17, and is rotated by the extension and retraction of hydraulic cylinders 9. The connector 8 is adapted to be connected directly with the crane pillow blocks 17 and with the hydraulic cylinders 9 without modification thereto. In this example, connector 8 comprises a rigid frame 32 having a pair of side plates 33 rigidly interconnected in a parallel, laterally spaced apart fashion. Side plates 32 are generally triangular in shape, and include a top plate 34 connected along the upper legs 35 thereof, and a front plate 36 connected along the forward edge 37 thereof. The connector plates 33, 34 and 36 are preferably integrally interconnected by means such as welding to form a rigid frame structure. An inner plate 42 (FIG. 7) is positioned directly behind front plate 36 in a parallel relationship therewith, and is fixedly attached to side plates 33 to form a hollow, rectangular sleeve 43 in the connector for purposes to be described hereinafter. The upper and lower ends 44 of inner plate 42 are spaced slightly inwardly from the ends of front plate 36. Tubular cross braces 45 also extend between the connector frame side plates and rigidly interconnect the same.

A pair of aligned sleeves 38 (FIG. 4) are attached to and protrude from the left and right-hand side plates 33 at the rearwardmost corner 39 of connector frame 32. Sleeves 38 are aligned with mating apertures in side plates 33, thereby forming a cylindrical cavity in which pin 27 is telescopingly received. Sleeves 38 are received between the inside surfaces of the pillow blocks 17, and pin 27 extends through both pillow blocks 17 and both sleeves 38 to pivotally connect the connector frame with the crane tractor. A rod 40 (FIGS. 4 and 6) extends through the upper corner 41 of the connector frame, and is fixedly attached to the side plates 33 by means such as welds. The ends of rod 40 protrude outwardly from side plates 33 a distance sufficient to form journals on which the hydraulic cylinder sleeves 20 are pivotally mounted, whereby extension and retraction of the hydraulic cylinders 9 pivots the connector frame upwardly and downwardly.

Figure 6:
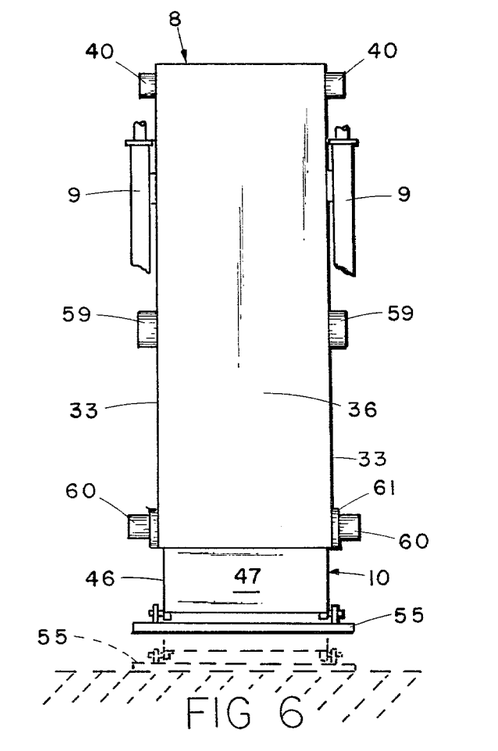
FIG. 6 is a front elevational view of the conveyor connector, with ram portions thereof broken away to better reveal external construction, and a ground engaging position shown in phantom.
Figure 7:
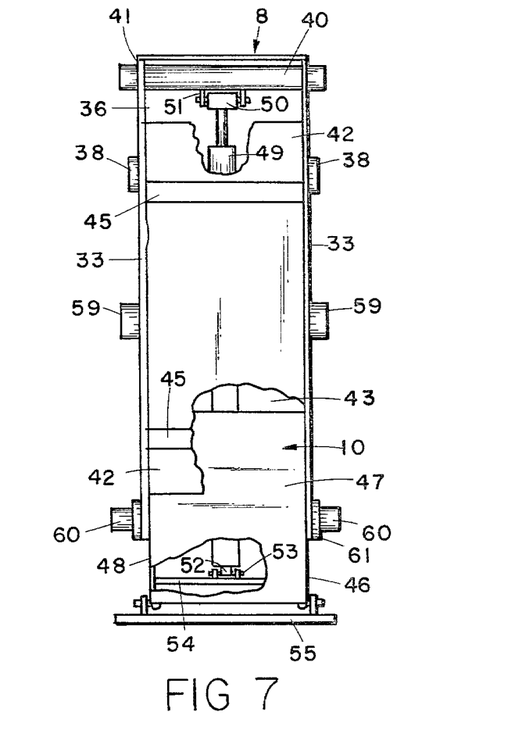
FIG. 7 is a rear elevational view of the conveyor connector, with the rams removed, and portions thereof broken away to reveal internal construction.

As best illustrated in FIGS. 6 and 7, stabilizer 10 includes a foot 46 which is adapted to selectively engage the ground to retain the conveyor in a preselected orientation over the trench. Stabilizer 10 is preferably connected with the mobile conveyor 1 at a point disposed adjacent to the upstream end of the conveyor belt assembly 3, and is telescopingly mounted in connector 8 for improved operation and compactness. The point at which stabilizer 10 is attached to the conveyor may be varied. However, it is contemplated that the preferred locus of attachment points for the stabilizer be limited to those portions of the conveyor disposed directly above the undug area of ground on the side of the trench at which the mobile conveyor 1 is located. In this manner, the conveyor can be supported in a cantilevered fashion over the trench, and obstructions along the sides of the trench will not cause substantial difficulty in moving the conveyor along the trench or positioning the conveyor at the various set up points.

In this example, stabilizer foot 46 comprises two pairs of parallel side and end plates 47 and 48 which are interconnected to form a hollow, box-like structure having a rectangular transverse cross section. Stabilizer foot 46 is telescopically received in the rectangular cavity or sleeve 43 formed between side plates 33 and the front and inner plates 36 and 42. A hydraulic cylinder, or other suitable ram 49 has its upper end 50 pivotally mounted in a clevis joint 51 on rod 40, and a lower end 52 pivotally mounted in a second clevice joint 53 located on a cross brace member 54 in stabilizer foot 46. A base plate 55 is pivotally attached to the frame side plates 33, and is adapted to engage or uneven or unlevel ground surfaces. Extension and retraction of cylinder 49 reciprocates stabilizer foot 46 within the connector frame sleeve 43 for stabilizing the conveyor and adjusting the elevation of the same during conveyance of excavated materials over the conveyor.

An arrangement is provided along the forward edge of connector frame 32 for detachably connecting the conveyor belt assembly 3 thereto. The illustrated arrangement comprises a pair of laterally aligned sleeves 59 (FIGS. 4, 6 and 7) located at a medial portion of connector frame 32 at the forward edge 37. Sleeves 59 are fixedly attached to the associated frame side plate, and form annular rings into which pins may be telescopically received. The conveyor mounting arrangement also includes a pair of laterally aligned studs 60 which are attached to the exterior sides of frame side plates 33 by reinforcing plates 61. Studs 60 protrude from the lower corner 62 of the connector frame, and are vertically aligned and spaced apart from sleeves 59.

As best illustrated in FIGS. 1 and 2, conveyor 3 comprises a continuously moving conveyor belt 66 which is slideably supported on an elongate frame 67. Frame 67 includes a plurality of free-wheeling rollers 68 which support the feed side of belt 66, and a pair of end drums 69 on which belt 66 is mounted. The drum 69 at the discharge end of the conveyor is preferably rotated by a pair of hydraulic motors 65 on both ends thereof, which are supplied with pressurized hydraulic fluid from the crane tractor 6. In this manner, the conveyor 3 need not include any independent or self-contained power unit, but can be remotely powered by the crane tractor. A second set of rollers 64 support the return side of conveyor belt 66. A hopper 70 is attached to the conveyor at the upstream end 71 thereof to facilitate loading dirt or other excavated materials onto the belt. The upper edge of hopper 70 is disposed below the upper plate 34 of connector 8 to minimize the vertical lift necessary to load dirt onto the conveyor. Because dirt is deposited into hopper 70 intermittently, it is preferred that the hopper include means such as a sliding gate 72 to meter the dirt deposited into the hopper onto conveyor belt 66 to create a substantially even flow. The conveyor frame 67 is an open, lightweight design, and includes a reinforced superstructure 73 with triangularly arranged cross braces 74 which rigidly support conveyor belt 66 is a loaded condition above the ground in a cantilevered fashion. The illustrated superstructure 73 includes three interconnected sections 75-77, wherein the first section 75 is substantially rectangular in shape with the lowermost support 78 disposed in a substantially horizontal plate. Superstructure 75 receives hopper 70 therein, so that the hopper has a lower profile to improve loading efficiency. The outer superstructure segments 76 and 78 taper inwardly toward the discharge end 7 of the conveyor.

Figure 8:
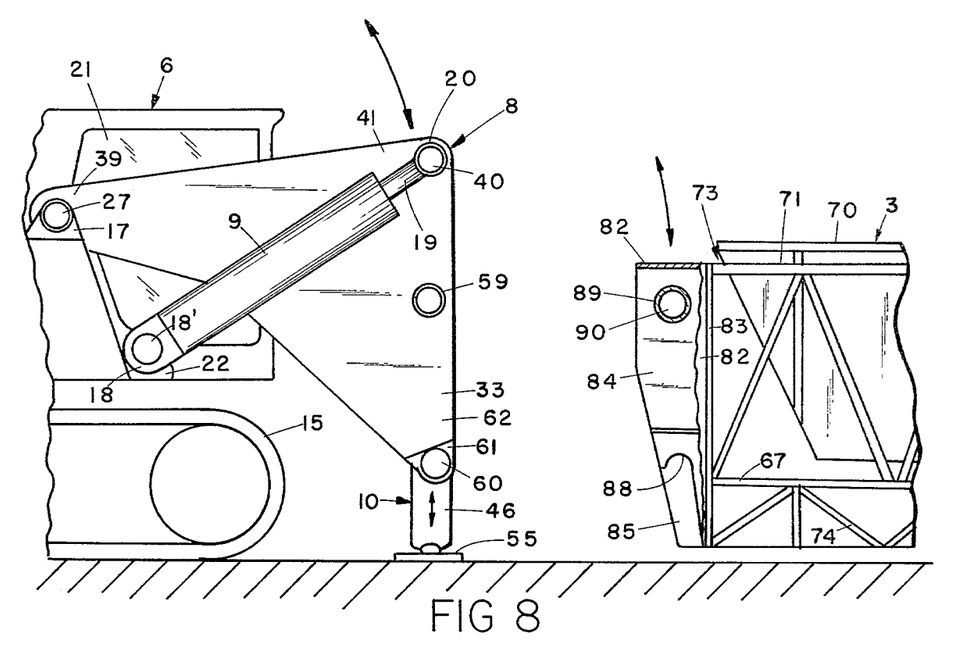
FIG. 8 is a fragmentary side elevational view of the connector and the conveyor in a separated, side-by-side relation, with portions of the conveyor broken away to reveal internal construction.
Figure 9:
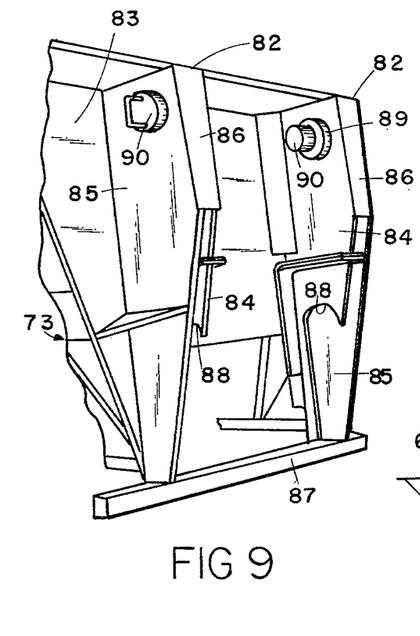
FIG. 9 is an enlarged, fragmentary, perspective view of an upstream end of the conveyor.

As best illustrated in FIGS. 8 and 9, the upstream end 71 of the conveyor is adapted for detachable connection with the forward end of connector 8. The upstream conveyor end 71 includes two laterally spaced apart and mutually parallel supports 82 which project outwardly from the forwardmost plate 83 of conveyor superstructure 73. Each support 82 includes inner and outer plates 84 and 85 interconnected by forward end plates 86, and extends vertically along the height of superstructure plate 83. A cross brace 87 interconnects outer plates 85 at the base thereof. The inner plates 84 include arcuately shaped notches or saddle portions 88 which are shaped to mate with and abuttingly engage the ends of studs 60. Bushings 90 are mounted in the upper ends of each pair of plates 84 and 85 in a laterally aligned relationship, and are vertically in line with the associated saddle portion 88. A pair of pins or journals 90 extend through each of the bushings 89 and protrude inwardly from the inner plates 84 of the supports. The conveyor 3 is attached to connector 8 by positioning the saddle portions 88 of inner plates 84 over studs 60, aligning bushings 89 with sleeves 59, and inserting pins 90 through the bushings and into the aligned sleeves. The conveyor 3 is thereby attached to connector 8 in a manner such that rotation of the connector also bodily pivots the conveyor.

Figure 10:
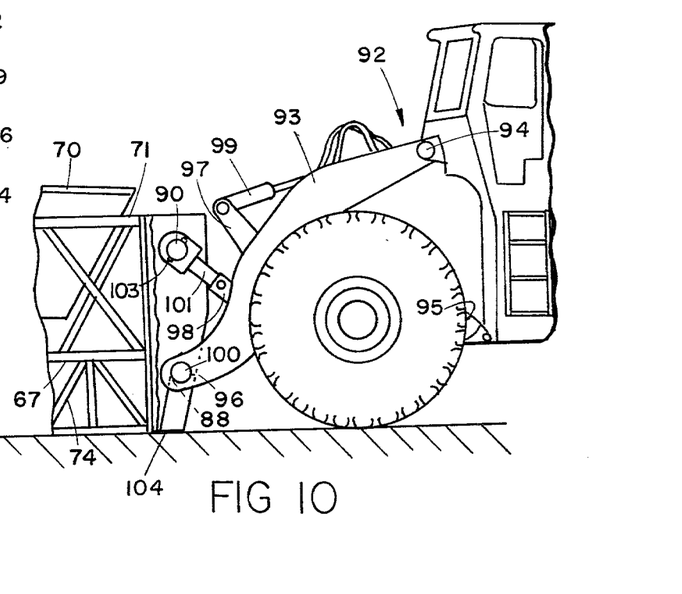
FIG. 10 is a side elevational view of the conveyor connected with a conventional, wheeled front loader machine.

As best illustrated in FIG. 10, the support arrangement 82 on the upstream end 71 of the conveyor is also adapted to be directly connected to a wheel loader, such as front wheel loader 92. The wheel loader 92 is conventional in construction, and includes a pair of arms 93 pivotally connected with the loader at joints 94 and rotated by hydraulic cylinders 95. The outer ends 96 of arms 93 are normally attached to a scoop (not shown) to perform earth moving and digging operations. Extension and retraction of cylinders 95 adjusts the elevation of the scoop. Scoop pivot arms 97 have free ends 98 connected with the scoop, and are rotated by hydraulic cylinder 99 to vary the angular orientation of the scoop. To connect conveyor 3 with the wheel loader 92, a rod 100, which is shaped to be matingly received in support notch 88, is attached to the outer ends of arms 93. Adaptors 101 are pivotally attached to each pivot arm 97, and include a bushing 102 in which pins 90 are received. A counterpin 103 or other suitable fastener retains the adaptors 101 on the pins 90. The lower support 78 of the first superstructure section 75 is adapted for supporting the conveyor on the ground. In the embodiment illustrated in FIG. 10, the conveyor is preferably supported directly on the ground when excavated material is being conveyed. Activation of ram 99 pivots the conveyor about ground point 104, and extension of rams 95 lifts the conveyor from transport to various locations.

A dolly 109 (FIG. 11) is provided to transport conveyor 3 over long distances, such as between job sites. Dolly 109 includes a frame 110 shaped to extend laterally across the conveyor, and a pair of ground engaging wheels 111 rotatably mounted on opposing ends of the trailer frame. Dolly 109 is detachably connected with the trailer frame by suitable fasteners, and is preferably located at a point disposed slightly upstream of the conveyor's longitudinal center of gravity. A hitch 112 is attached to the conveyor frame at the discharge end 7. Since the conveyor does not include a self-contained engine or other power plant thereon, it is relatively lightweight and can be readily towed by hitch 112 with a conventional vehicle, such as a pick-up truck. The conveyor is preferably stored with a block 113 under the discharge end 7 to raise hitch 112 to the height of the truck hitch.

Figure 11:
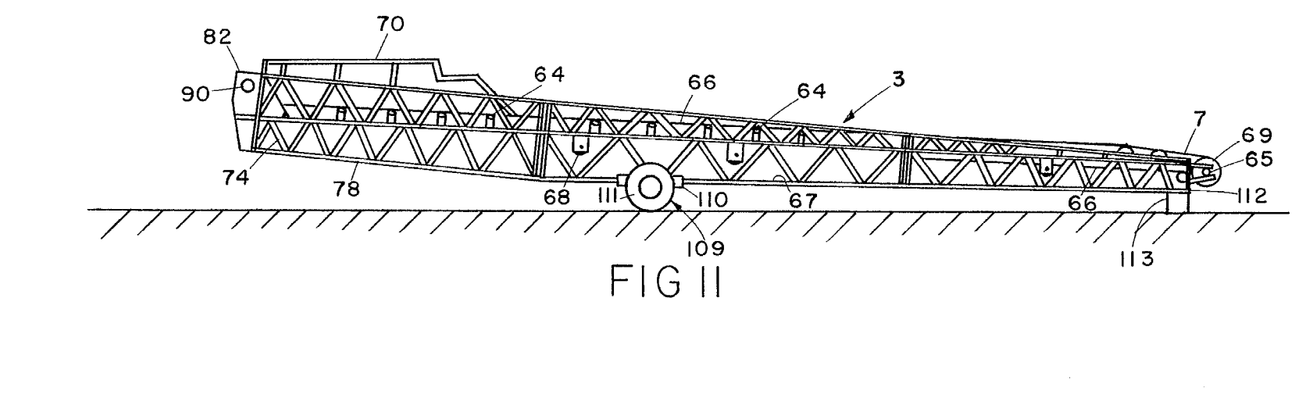
FIG. 11 is a side elevational view of the conveyor shown in a storage position with a transport dolly connected therewith.

If conveyor 3 is attached to crane tractor 6, to prepare the conveyor for transport, hitch 112 is first pivotally lowered into the mating hitch portion on the tow vehicle (not shown) by manipulating cylinders 9 and 49 to achieve proper elevation for the discharge conveyor end 7. Connector 7 is rotated slightly downwardly until the weight on connector pin 27 is removed, and pin 27 is then withdrawn from pillow blocks 17. The conveyor is then supported by saddle portions 88 on studs 60. Cylinders 9 are activated to adjust the elevation of the upstream end of the conveyor to a height at which dolly 109 can be rolled under the conveyor superstructure 73. Cylinders 9 are then retracted to pivotally lower the conveyor onto the dolly, and the conveyor and dolly are interconnected by suitable fasteners. Next, connector 8 is lowered so that studs 60 are free from saddle portions 88, and the conveyor is trailed, discharge end first, to the desired location.

In use, to mount the conveyor 3 on a crane tractor 6, connector 8 is first attached to the crane tractor. Connector frame 32 is positioned between pillow blocks 17, and pin 27 is inserted through the same to pivotally attach the rearward corner of the connector frame with the crane tractor. The sleeves 20 on hydraulic cylinders 9 are then attached to the outer ends of rod 40, such that extension and retraction of the cylinders 9 pivots the connector 8 in a substantially vertical plane. The stabilizer cylinder 49 and hydraulic motor 65 are then connected with sources of pressurized hydraulic fluid from the crane tractor 6, so that the cylinder and motor can be independently controlled from the vehicle cab 21. With the stabilizer foot 46 fully retracted, the crane tractor 6 is driven to the location at which conveyor 3 is stored. The operator then manipulates rams 9 to rotate connector 8 downwardly to a position wherein studs 60 are located below the mating saddle portions 88. The conveyor 3 is normally stored on the trailer dolly 109, such that the discharge conveyor end 7 rests on block 113. Crane tractor 6 is then moved forwardly into a position wherein studs 60 are received in the notched saddle portions 88. If sleeves 59 are not aligned in a colinear relationship with bushings 89, the operator adjusts the position of cylinders 9 and 49 to rotate connector 8 into a position wherein proper alignment is achieved. Pins 90 are then inserted through both of the sleeves 59 and bushings 89, thereby attaching conveyor 3 with connector 8. Trailer dolly 109 is detached from conveyor 3, and extension of cylinders 9 pivotally separates the conveyor from the dolly.

The conveyor unit 1 is preferably positioned to one side of the centerline of the trench 2, as shown in FIG. 2, at a point adjacent to the excavating machine which is digging the trench, such as backhoe 115. Conveyor assembly 1 should be positioned in a manner such that backhoe 115 can easily drop the excavated dirt directly into hopper 70. The body 16 of the crane tractor is then pivoted in a horizontal plane until the discharge end 7 of the conveyor is positioned at a predetermined position above the trench 2. Usually, it is preferred that the conveyor discharge end 7 be located directly above the center of the trench. However, for very wide ditches, it may be desirable to pivot the conveyor discharge end between the sides of the ditch. This may be accomplished by simply pivoting the crane body 16 along with conveyor 3 with respect to the crane tractor drive mechanism 15. The elevation of conveyor discharge end 7 is then adjusted to a height which permits a backfill bulldozer 16 to safely pass thereunder, so as to spread dirt over the newly laid pipe 117, and compact dirt around the pipe. The operator can easily adjust the elevation of the conveyor discharge end 7 by activating cylinders 9, which in turn pivots connector 8 and conveyor 3 therewith in a substantially vertical plane. After the conveyor 3 has been properly positioned both vertically and laterally alongside trench 2, stabilizer foot 46 is extended until base plate 55 engages the ground and supports the weight of the conveyor thereon. Hydraulic fluid under pressure activates motor 65 and moves the conveyor belt 66 at a substantially constant speed. Backhoe 115 loads dirt into hopper 70, and gate 72 meters an even flow of dirt onto the conveyor belt. The excavated materials are thereby transported on the conveyor from the digging point 4 to the filling point 5 of trench 2. For the aforementioned applications, backfill bulldozer 116 pushes the dirt deposited at the conveyor discharge end under the conveyor and into the trench to cover pipe 117 and compact the dirt thereover. Cylinders 9 preferably have internal accumulators which act as shock absorbers when dirt is intermittently dumped into the hopper from the backhoe. If, during the conveying process, the elevation of the conveyor should shift due to normal settling, soft ground or the like, the operator simply activates stabilizer cylinder 49 while the conveyor is running to pivot the conveyor about pin 27 into the desired position.

After backhoe 115 has dug trench 2 to a position where the backhoe bucket 118 can no longer reach the conveyor hopper 70, after the conveyor belt has cleared itself of dirt, cylinders 9 are extended to slightly lift the conveyor. Stabilizer cylinder 49 is then retracted to lift the stabilizer foot 46, and the crane tractor 6 is moved rearwardly along a path parallel with the trench to a position wherein backhoe bucket 118 can again deposit dirt into conveyor hopper 70. The conveyor is repositioned over the desired portion of the trench at the proper elevation and lateral position, and is stabilized in the above described manner.

The connector 8 and stabilizer 10 support the conveyor in a non-suspended, fully cantilevered manner, such that the discharge end 7 of the conveyor can be easily positioned over the trench without interference with obstructions disposed alongside the trench. The elevation of the discharge end of the conveyor can be adjusted while the conveyor is operating by manipulating the stabilizer foot 46. Further, because the conveyor is not suspended by overhead cables, dirt may be positioned directly into the lower profile hopper for efficient handling of the dirt. The connector 8 allows the user to easily detach the conveyor from the crane tractor, such that the latter can be used in other applications on the job site. The attachment design on the conveyor also permits direct connection with a wheel loader. Further, the cantilevered arrangement of the conveyor permits the same to be easily attached to the transport dolly for moving the conveyor between job sites.

In the foregoing description, it will be readily apparent to those skilled in the art that many modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows.

1. A mobile conveyor arrangement for filling trenches and the like, comprising:
   a conveyor having upstream and downstream ends, and means for transporting excavated trench material thereon from a digging point to a filling point of a trench;
   mobile power means operably connected with said conveyor for intermittently moving said conveyor longitudinally along the trench to conveyor set up points, and laterally positioning said conveyor with respect to the trench;
   means for pivotally connecting the upstream end of said conveyor with said mobile power means for pivotal movement in a substantially vertical plane; said connecting means comprising a connector having one portion adapted for detachable connection with said conveyor and another portion adapted to be rotatably mounted in a boom arm pivot block portion of said mobile power means;
   stabilizing means depending from said conveyor and adapted to selectively engage the ground at the conveyor set up points along the trench and support said conveyor in the selected position during conveyance of the excavated material; said stabilizer means comprising a longitudinally adjustable foot connected with and depending from said connector; said foot supporting said conveyor in a cantilevered fashion over said trench, and being extended and retracted to pivot the conveyor at said boom arm pivot block portion for varying the elevation of the downstream end of said conveyor during conveyance of the excavated materials.

2. A mobile conveyor arrangement as set forth in claim 1, wherein:
   said foot includes a free end with a base plate pivotally attached thereto for engaging unlevel terrain.

3. A mobile conveyor arrangement as set forth in claim 2, wherein:
   said foot normally retains said conveyor at an elevation adjacent to the ground for efficient loading of said conveyor.

4. A connector for attaching a trench conveyor to a crane of the type having bearing blocks in which a pivot arm is normally mounted and a pair of rams for normally pivoting the arm, said connector comprising: a rigid frame having a first pivot joint thereon for pivotally connecting said connector in the crane bearing blocks for rotation in a substantially vertical plane; a second pivot joint on said frame for pivotally connecting the outer ends of the rams with said connector at a point spaced apart from said first pivot joint, whereby extension and retraction of said ram pivots said connector about said first pivot joint;

means for connecting said frame with the conveyor, whereby said connector and the conveyor pivot together to a selected position; and a longitudinally adjustable foot connected with and depending from said frame and adapted to engage the ground during the conveyance of excavated materials on the conveyor for retaining the conveyor in the selected position.

5. A connector as set forth in claim 4, wherein:

said connecting means is adapted for detachably connecting the conveyor with said connector.

6. A connector as set forth in claim 4, wherein:

said frame comprises a pair of parallel, laterally spaced, interconnected plates; and said foot is telescopically mounted in a sleeve formed between said frame plates, and includes a ram for extending and retracting the same.

7. A connector as set forth in claim 4, wherein:

said foot includes a base plate pivotally mounted on the free end thereof to conform to various terrains.

8. A connector as set forth in claim 7, wherein:

said frame plates are triangularly shaped and include a forward leg and a lower corner.

9. A connector as set forth in claim 8, wherein said connecting means further comprises;

a pair of laterally aligned pins extending outwardly from said frame plate at the lower corner thereof and adapted to be received in arcuately shaped saddle portions of the conveyor.

* * * * *